3,054,757
POLYURETHANE PRODUCTION WITH IMINES AS CATALYSTS
J W. Britain, New Martinsville, W. Va., assignor to Mobay Chemical Company, Pittsburgh, Pa., a corporation of Delaware
No Drawing. Filed Feb. 8, 1960, Ser. No. 7,115
7 Claims. (Cl. 260—2.5)

The invention relates generally to the catalysis of chemical reactions and, more particularly, to the catalysis of a reaction between a reactive hydrogen atom and an isocyanate or isothiocyanate group.

Polyurethane and polythiourethane plastics are prepared by a process in which an organic compound having reactive hydrogens is reacted with either an organic polyisocyanate or organic polyisothiocyanate. The rate of reaction between the reactive hydrogen atom and the —NCO or —NCS group can be modified by incorporating a catalyst in the reaction mixture. It has been proposed heretofore to include a catalytic amount of tertiary amine in the reaction mixture. However, most of the tertiary amines heretofore available will not materially accelerate the reaction rate between the hydrogen of a secondary hydroxyl group and an —NCO group so they have not been entirely satisfactory as catalysts in preparing urethanes from compounds having secondary hydroxyl groups, such as, for example, a polyoxypropylene glycol. Most of the tertiary amines heretofore available have also been found to be objectionable because they have an undesirable odor which remains with the polyurethane for an extended period of time after its formation. These tertiary amines also have not been entirely suitable for catalysis of reactions of other compounds having reactive hydrogen atoms with —NCO or —NCS groups either because of the odor or because they do not accelerate the reaction sufficiently to be adaptable to large scale production.

Therefore, an object of this invention is to provide an improved catalyst for reactions between a reactive hydrogen atom and an —NCO or —NCS group. Another object of the invention is to provide an improved method for reacting an organic compound having reactive hydrogen with an organic isocyanate or organic isothiocyanate. Still another object of the invention is to provide a method for making polyurethane plastics from organic polyisocyanates or organic polyisothiocyanates and organic compounds having reactive hydrogen in either secondary hydroxyl groups or primary hydroxyl groups without imparting an objectionable odor to the product which remains therewith for an appreciable time.

The foregoing objects and others are accomplished in accordance with this invention, generally speaking, by providing a method of catalyzing the reaction between an organic compound having reactive hydrogen and an organic isocyanate or organic isothiocyanate with a catalytic amount of a compound having the formula

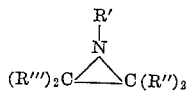

wherein R′ is an alkyl radical, and R″ and R‴ are either hydrogen, alkyl or aryl radicals. It has been found that a polyurethane plastic which is substantially free from the odor ordinarily associated with a tertiary amine shortly after the polyurethane plastic has been formed can be prepared from an organic compound having reactive hydrogen atoms and an organic polyisocyanate or organic polyisothiocyanate even if the reactive hydrogen is contained in a secondary hydroxyl group if a compound having the above formula is inclined in a catalytic amount in the reaction mixture. It has also been found that a one-shot process for making polyurethanes is made possible by the catalyst of this invention even with compounds having secondary hydroxyl groups like a polyhydric polyoxypropylene. The invention thus contemplates in its broadest aspect the acceleration of any chemical reaction between a reactive hydrogen atom and an —NCO or —NCS group and in particular contemplates the preparation of polyurethane and polythiourethane plastics while using catalysts having the above formula.

Any compound having the general formula given above may be used in accordance with this invention. R′ in the formula may be methyl, ethyl, propyl, butyl, octyl, benzyl or any other suitable alkyl radical. The alkyl radical may be substituted with any group which is unreactive to the nitrogen atom shown in the above formula, such as, for example, an hydroxyl, nitro or tertiary amino group. R″ and R‴ may be hydrogen or an alkyl or aryl radical. Examples of suitable alkyl and aryl radicals are methyl, ethyl, propyl, butyl, amyl, hexyl, octyl, benzyl, phenyl, naphthyl or the like. The alkyl or aryl radical may be substituted with any group which is unreactive to the nitrogen atom shown in the above formula, such as, for example, hydroxyl, nitro or tertiary amino group. It is preferred that R″ and R‴ be hydrogen or a lower alkyl radical of up to seven carbon atoms including, for example, heptyl and benzyl. Compounds contemplated by the invention thus include N-ethyl-ethylenimine, N-methyl-ethylenimine, N-benzyl-ethylenimine, N-ethyl-dimethyl-ethylenimine, N-octyl-dibenzyl-ethylenimine, N-ethyl-methyl-ethyl-ethylenimine and N-butyl-dinaphthyl-ethyl-enimine. N-lower alkyl-lower alkylenimines in which the alkyl and alkylene radicals contain up to 5 carbon atoms are preferred. The invention contemplates broadly any catalytic amount of the catalyst but ordinarily from about 0.1 percent to about 10 percent by weight based on the weight of the compound having the reactive hydrogen atom should be used for best results. It is to be noted that R′ in the above formula cannot be hydrogen because such a compound, i.e. ethylenimine, would react with the isocyanate and would not be a catalyst.

By "organic compound having reactive hydrogen" as used herein and in the claims is meant any organic compound having at least one hydrogen atom determinable by the Zerewitinoff method. This method is described by Kohler et al., J. Am. Chem. Soc. 49, 3181 (1927). Such hydrogen atoms are reactive with an —NCO or —NCS group. Preferably, the reactive hydrogen atom is contained in an hydroxyl group but it can also be contained in a primary amino group, a carboxyl group, a urethane or urea group or any other group adapted to react with an —NCO or —NCS group. The reaction product of an amine and isocyanate is a urea. The reaction of a carboxyl group and —NCO group produces an amide and the reaction of an hydroxyl group and —NCO produces a urethane.

Any suitable organic compound having reactive hydrogen as defined herein may be used. Examples of such compounds include monohydric alcohols, polyhydric alcohols, urethanes, mercaptans, ureas, carboxylic acids, amines and the like. More specifically, the compound may be ethyl alcohol, methyl alcohol, propyl alcohol, isopropyl alcohol, butyl alcohol, amyl alcohol, octadecyl alcohol, benzyl alcohol, benzoic acid, benzylamine, acetic acid, adipic acid, hydroxy adipic acid, ethylene glycol, thiodiglycol, diethylene glycol, propylene glycol, tetramethylene glycol, octadecyl glycol, terephthalic acid, ethylene diamine, phthalic acid, glycine, glycerine, trimethylol propane, sorbitol, ethanolamine, succinic acid, maleic acid, tartaric acid, citric acid or the like. In preparing a polyurethane, the organic compound having reactive hydrogen has at least two reactive hydrogen atoms and may be a polyester, a polyhydric polyalkylene ether, a polyhydric polythioether, a polyesteramide, a polyacetal, the polymer of carbon monoxide and an olefine or the like. Preferably, the organic compound having reactive hydrogen used in making a polyurethane has a molecular weight of at least about 500, an hydroxyl number of not more than about 225 and an acid number of not more than about 10. The polyester may be prepared by condensing any suitable polyhydric alcohol with any suitable polycarboxylic acid. The polycarboxylic acid may be either aromatic or aliphatic. Examples of suitable polycarboxylic acids are adipic acid, succinic acid, phthalic anhydride, terephthalic acid, maleic acid, malonic acid and the like including those disclosed in U.S. Patent Reissue 24,514. Examples of suitable polyhydric alcohols include ethylene glycol, diethylene glycol, hexanetriol, glycerine, trimethylol propane and the like including those disclosed in U.S. Patent Reissue 24,514.

The polyhydric polyalkylene ether may be prepared by condensing an alkylene oxide or by condensing an alkylene oxide with a polyhydric alcohol. It may also be prepared by polymerizing tetrahydrofuran. Examples of suitable oxides include ethylene oxide, propylene oxide, butylene oxide and the like. Examples of suitable polyhydric alcohols are ethylene glycol, diethylene glycol, glycerine, pentaerythritol, hexanetriol, trimethylol propane and the like. It is preferred to use a lower alkylene oxide having up to five carbon atoms. The invention is particularly well suited for preparing polyurethanes from compounds having secondary hydroxyl groups, such as, for example, polyhydric polyoxypropylenes. Such compounds are ordinarily prepared by condensing propylene oxide with a trihydric alcohol or a glycol, such as glycerine, trimethylol propane, hexanetriol, ethylene glycol or diethylene glycol. If desired, the polyhydric polyalkylene ether can be prepared from two or more alkylene oxides, such as, for example, ethylene and propylene oxides.

The polythioether may be prepared by any suitable process, such as, by condensing thiodiglycol. Methods for making suitable polythioethers are disclosed in U.S. Patents 2,862,972 and 2,900,368.

An amino alcohol, such as ethanolamine, can be included in the preparation of the polyester in order to produce a polyesteramide suitable for use in this invention. For example, a polyesteramide prepared from ethylene glycol, ethanolamine and adipic acid may be used.

The polyacetal may be prepared by any suitable process, such as, for example, by condensing an aldehyde, such as formaldehyde with a polyhydric alcohol, such as ethylene glycol or one of the other polyhydric alcohols disclosed above for making polyesters.

The copolymer of carbon monoxide and an olefine may be one of those disclosed in U.S. Patent 2,839,478, such as, for example, an ethylene-propylene-carbon monoxide copolymer.

Any suitable organic isocyanate, aromatic, aliphatic or heterocyclic isocyanate may be used in the reaction in accordance with this invention. Examples of suitable isocyanates include hexamethylene diisocyanate, 2,4-toluylene diisocyanate, 2,6-toluylene diisocyanate, 1-methyl-2,4-diisocyanato cyclohexane, 1,5-naphthylene diisocyanate, 2,4,6-triisocyanato-s-triazine, 4,4-diphenylmethane diisocyanate, furfuryl isocyanate, methyl isocyanate, ethyl isocyanate, butyl isocyanate, isopropyl isocyanate, octadecyl isocyanate, thienyl isocyanate, eicosyl isocyanate, phenyl isocyanate, chloro-propyl-isocyanate, nitrophenyl isocyanate, ethyl isothiocyanate, phenyl isothiocyanate, isopropenyl isocyanate, benzyl isocyanate, vinyl phenyl isocyanate, 2,4-toluylene diisothiocyanate, tolyl isocyanate, 1,5-naphthylene diisothiocyanate, naphthyl isothiocyanate, phenyl isothiocyanate, 4,4',4''-triphenyl methane triisocyanate, cyclohexane diisocyanate and the like including all of those disclosed in U.S. Patent Reissue 24,514. A dimer or trimer of a polyisocyanate, such as the dimer and trimer of 2,4-toluylene diisocyanate or p-phenylene diisocyanate, may be used. Likewise, the isocyanate can be a reaction product of an excess of monomeric polyisocyanate with a polyester or polyalkylene ether or the like, such as, the reaction product of two mols 2,4-toluylene diisocyanate and one mol of a polyester prepared from three mols ethylene glycol and two mols adipic acid. Adducts of this type of any molecular weight can be used. Any amount of organic isocyanate or isothiocyanate can be used in conjunction with the catalyst provided by this invention. Often an amount of isocyanate or isothiocyanate equivalent to the reactive hydrogen of the organic compound, i.e. polyester, polyhydric polyalkylene ether or the like, will be used. In preparing a polyurethane, it is preferred to use from about 0.9 equivalent of —NCO or —NCS to about 2.5 equivalents thereof per reactive hydrogen of the organic compound having reactive hydrogen.

Preferably, an excess of —NCO or —NCS over that required to react with the organic compound having reactive hydrogen is used in preparing a cellular polyurethane. Preferably, the amount of —NCO or —NCS used will be about equivalent to the sum of the reactive hydrogen of the organic compound having reactive hydrogen and water or other chain extender or cross linker, such as those disclosed in U.S. Reissue 24,514.

In preparing a cellular polyurethane, it is desirable to include a foam stabilizer. Silicone compounds are preferred. For example, dimethyl siloxane or other lower alkyl siloxane can be used to advantage in many formulations, particularly if the organic compound having reactive hydrogens is a polyester. When polyhydric polyalkylene ethers are used as the resinous component, it is preferred to use a compound having the following formula with the catalyst provided by this invention

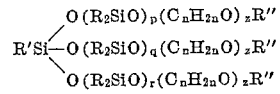

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer so a process which combines this catalyst and stabilizer is contemplated by the invention as a preferred embodiment. Compounds represented by the formula and a method for making them are disclosed in U.S. Patent 2,834,748. This stabilizer can also be used with all of the other organic compounds having reactive hydrogens if desired.

*Example 1*

About 1 part by weight of N-ethyl-ethylenimine is mixed with about 9 parts by weight dioxan. About 100 parts of a liquid polyoxypropylene triol is added to the mixture and stirred until a clear solution is obtained. The polyoxypropylene triol is one which has been prepared by condensing propylene oxide with glycerine, has a molecular weight of about 3,000 and an hydroxyl number of about 56. About 8.7 parts by weight of a mixture of 80 percent 2,4-toluylene diisocyanate and 20 percent 2,6-toluylene diisocyanate are added to the mixture in dioxan and stirring is continued until a substantially uniform mixture is obtained. The resulting mixture is heated at about 70° C. until the mixture gels. About 32 minutes are required.

In a similar test with the same reactive components in the same amounts and under the same reaction conditions but with the one exception that one part by weight N-ethyl morpholine is used for the catalyst instead of N-ethyl-ethylenimine, the gelation time is 180 minutes.

In still another test in which all of the reactants and reaction conditions are the same as used with N-ethylethylenimine, with the exception that dimethyl aniline is used as a catalyst, more than 240 minutes are required for gelation.

In still another experiment in which the reactants and the reaction conditions are identical with those used with N-ethyl-ethylenimine with the exception that triethyl amine is used as the catalyst, the gelation time is 120 minutes.

In still another experiment in which the reactants and the reaction conditions are identical with those used in Example 1 with N-ethyl-ethylenimine but no catalyst at all is included in the mixture, the gelation time is more than 240 minutes.

*Example 2*

About 1 part by weight of N-methylethylenimine is mixed with about 100 parts of a liquid polyoxypropylene triol until a clear solution is obtained. The polyoxypropylene triol is one which has been prepared by condensing propylene oxide with glycerine, has a molecular weight of about 3,000 and an hydroxyl number of about 56. About 8.7 parts by weight of a mixture of 80 percent 2,4-toluylene diisocyanate and 20 percent 2,6-toluylene diisoyanate are added to the mixture and stirring is continued until a substantially uniform mixture is obtained. The resulting mixture is heated at about 70° C. until the mixture gels.

*Example 3*

About 1 part by weight of N-benzylethylenimine is mixed with about 100 parts of a liquid polyoxypropylene triol until a clear solution is obtained. The polyoxypropylene triol is one which has been prepared by condensing propylene oxide with glycerine, has a molecular weight of about 3,000 and an hydroxyl number of about 56. About 8.7 parts by weight of a mixture of 80 percent 2,4-toluylene diisocyanate and 20 percent 2,6-toluylene diisocyanate are added to the mixture and stirring is continued until a substantially uniform mixture is obtained. The resulting mixture is heated at about 70° C. until the mixture gels.

*Example 4*

About 1 part by weight of N-ethyl-dimethyl ethylenimine is mixed with about 100 parts of a liquid polyoxypropylene triol until a clear solution is obtained. The polyoxypropylene triol is one which has been prepared by condensing propylene oxide with glycerine, has a molecular weight of about 3,000 and an hydroxyl number of about 56. About 8.7 parts by weight of a mixture of 80 percent 2,4-toluylene diisocyanate and 20 percent 2,6-toluylene diisocyanate are added to the mixture and stirring is continued until a substantially uniform mixture is obtained. The resulting mixture is heated at about 70° C. until the mixture gels.

*Example 5*

About 1 part by weight of N-butylethylenimine is mixed with about 100 parts of a liquid polyoxypropylene triol until a clear solution is obtained. The polyoxypropylene triol is one which has been prepared by condensing propylene oxide with glycerine, has a molecular weight of about 3,000 and an hydroxyl number of about 56. About 8.7 parts by weight of a mixture of 80 percent 2,4-toluylene diisocyanate and 20 percent 2,6-toluylene diisocyanate are added to the mixture and stirring is continued until a substantially uniform mixture is obtained. The resulting mixture is heated at about 70° C. until the mixture gels.

*Example 6*

About 100 parts by weight polyoxypropylene triol having an average molecular weight of about 3,000 prepared by condensation of propylene oxide with glycerine and having an hydroxyl content of about 1.7 percent by weight, about 38 parts of a mixture of 80 percent 2,4-toluylene diisocyanate and 20 percent 2,6-toluylene diisocyanate, about 11.5 parts of an activator mixture containing about 5 parts N-ethylethylenimine, about 3 parts water and about 3.5 parts of a stabilizer having the formula

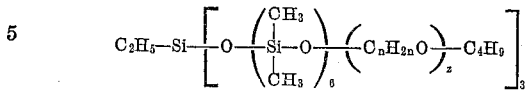

wherein ($C_nH_{2n}O$) represents about 17 oxyethylene units and about 12 oxypropylene units and the value of $z$ is thus about 30, are mixed together substantially simultaneously with an apparatus of the type disclosed in U.S. Patent Reissue 24,514. The diisocyanate and activator mixture are injected into a stream of the polyoxypropylene triol in this apparatus and mixing of the components is achieved substantially instantaneously. The resulting mixture is discharged from the apparatus and chemical reaction occurs almost instantaneously with hte reaction mixture beginning to foam and expand. After chemical reaction has subsided, the expanded cellular mixture solidifies into a cellular polyurethane having a density of about 2 pounds per cubic foot.

*Example 7*

About 100 parts by weight polyoxyethylene glycol having an average molecular weight of about 2,000 prepared by condensation of ethylene oxide and having an hydroxyl number of about 56 are mixed with about 38 parts by weight of a mixture of 80 percent 2,4-toluylene diisocyanate, 20 percent 2,6-toluylene diisocyanate and about 9.5 parts of an activator mixture containing about 5 parts N-benzylethylenimine, about 3 parts water and about 1½ parts of a stabilizer having the formula

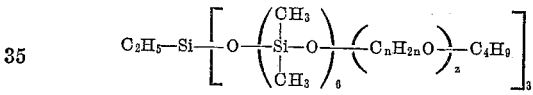

wherein ($C_nH_{2n}O$) represents about 17 oxyethylene units and about 12 oxypropylene units and the value of $z$ is thus about 30, are mixed together substantially simultaneously with an apparatus of the type disclosed in U.S. Patent Reisue 24,514. The diisocyanate and activator mixture are injected into a stream of the polyoxyethylene glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

*Example 8*

About 100 parts by weight of polypropylene glycol having an average molecular weight of about 2,000 are mixed with about 3 parts trimethylol propane and heated until the temperature is about 65° C. About 18 parts of a mixture of 80 percent 2,4-toluylene diisocyanate are added to the mixture at this temperature. The mixture is then heated to about 115° C. Chemical reaction between the diisocyanate and the polypropylene glycol and trimethylol propane is effected under substantially anhydrous conditions at this temperature until a viscosity of about 1500 centipoises at 73° C. is obtained. About 18 parts by weight of the same diisocyanate mixture as used before are added at this temperature and the reaction product is then cooled immediately to about 20° C. The resulting prepolymer having terminal —NCO groups has an —NCO content of about 7 percent and a viscosity of about 20,000 centipoises at about 20° C.

About 100 parts by weight of the prepolymer are mixed with about 6 parts by weight of a mixture of 80 percent 2,4-toluylene diisocyanate and 20 percent 2,6-toluylene diisocyanate, about 2.1 parts water and about 5 parts N-ethylethylenimine catalyst. Preferably, these components are mixed together in accordance with the process and in the apparatus disclosed in U.S. Patent Reissue 24,514. After complete mixing has been achieved and before any substantial amount of chemical reaction with evolution of carbon dioxide, the reaction mixture is discharged from the mixing apparatus into a suitable container where chemical reaction proceeds at room temperature to form a solidified polyurethane plastic and carbon dioxide. The polyurethane plastic is a cellular material having a density of about 2.5 pounds per cubic foot.

Example 9

About 100 parts by weight of polyoxypropylene triol prepared by condensing propylene oxide and glycerine having a molecular weight of about 3,000 and an —OH content of about 1.7 percent by weight, about 1 part N-ethylethylenimine and about 9 parts of a mixture containing about 80 percent 2,4-toluylene diisocyanate and about 20 percent 2,6-toluylene diisocyanate are simultaneously mixed together under substantially anhydrous conditions substantially instantaneously. The resulting mixture reacts to form a solid substantially nonporous rubber-like polyurethane. The mixture before it has solidified may be molded by pouring it into a suitable mold and heating, it may be spread on a suitable support to form a sheet or it may be used for coating textiles or the like.

It is to be understood that any of the other organic compounds having reactive hydrogen disclosed as suitable herein may be substituted in the foregoing working examples for those used. Likewise, any other suitable organic isocyanate or isothiocyanate can be substituted for the particular one used in the foregoing examples by adjusting the weight thereof to provide a similar amount of —NCO or —NCS. It is preferred, however, to use an organic isocyanate. Any other embodiment of the catalyst disclosed as operable herein can be substituted in the foregoing examples for the particular catalysts used. Likewise, variations can be made by those skilled in the art in the order of addition of the compounds and in the order of manipulative steps.

The catalyst provided by this invention is useful in any catalytic process wherein an organic compound having reactive hydrogen is reacted with a compound having either —NCO or —NCS groups. For convenience, —NCO and —NCS groups can be referred to collectively as —NCX groups wherein the X is either oxygen or sulfur.

The polyurethane plastics prepared in accordance with this invention can be used for making vehicle tires, upholstery, cushions, lacquers, rubber-like machine parts, such as bearings, and the like.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the preparation of polyurethanes and polythiourethanes by a process wherein an organic compound having reactive hydrogens as determined by the Zerewitinoff method, a molecular weight of at least about 500, an hydroxyl number of not more than about 225 and an acid number of not more than about 10 and an organic compound having at least two —NCX groups wherein X is selected from the group consisting of oxygen and sulfur are reacted together, the improvement which comprises including in the reaction mixture a catalytic amount of a compound having the formula

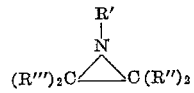

wherein R' is an alkyl radical, and R'' and R''' are selected from the group consisting of hydrogen, alkyl and aryl radicals.

2. The process of claim 1 wherein the catalyst is N-lower-alkyl-lower-alkylenimine.

3. The process of claim 1 wherein the catalyst is N-ethyl-ethylenimine.

4. The process of claim 1 wherein water is included in the reaction mixture and the amount of polyisocyanate is in excess over that required to react with all of the hydroxyl groups of the organic compound having reactive hydrogen.

5. The process of claim 1 wherein the organic compound having reactive hydrogen is a polyhydric polyoxyalkylene ether.

6. The process of claim 1 wherein the product is cellular and the organic compound having reactive hydrogen is a polyhydric polyoxyalkylene ether, the reaction mixture contains water and an excess of organic polyisocyanate over that required to react with all of the hydroxyl groups with that of the polyhydric polyoxyalkylene and the reaction mixture contains a compound having the formula

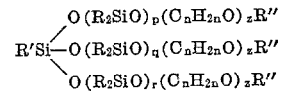

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

7. The process of claim 1 wherein a polyurethane is prepared and X in the formula —NCX is oxygen.

References Cited in the file of this patent
UNITED STATES PATENTS
2,824,857  Dreschsel _____ Feb. 25, 1958